United States Patent Office 3,469,994
Patented Sept. 30, 1969

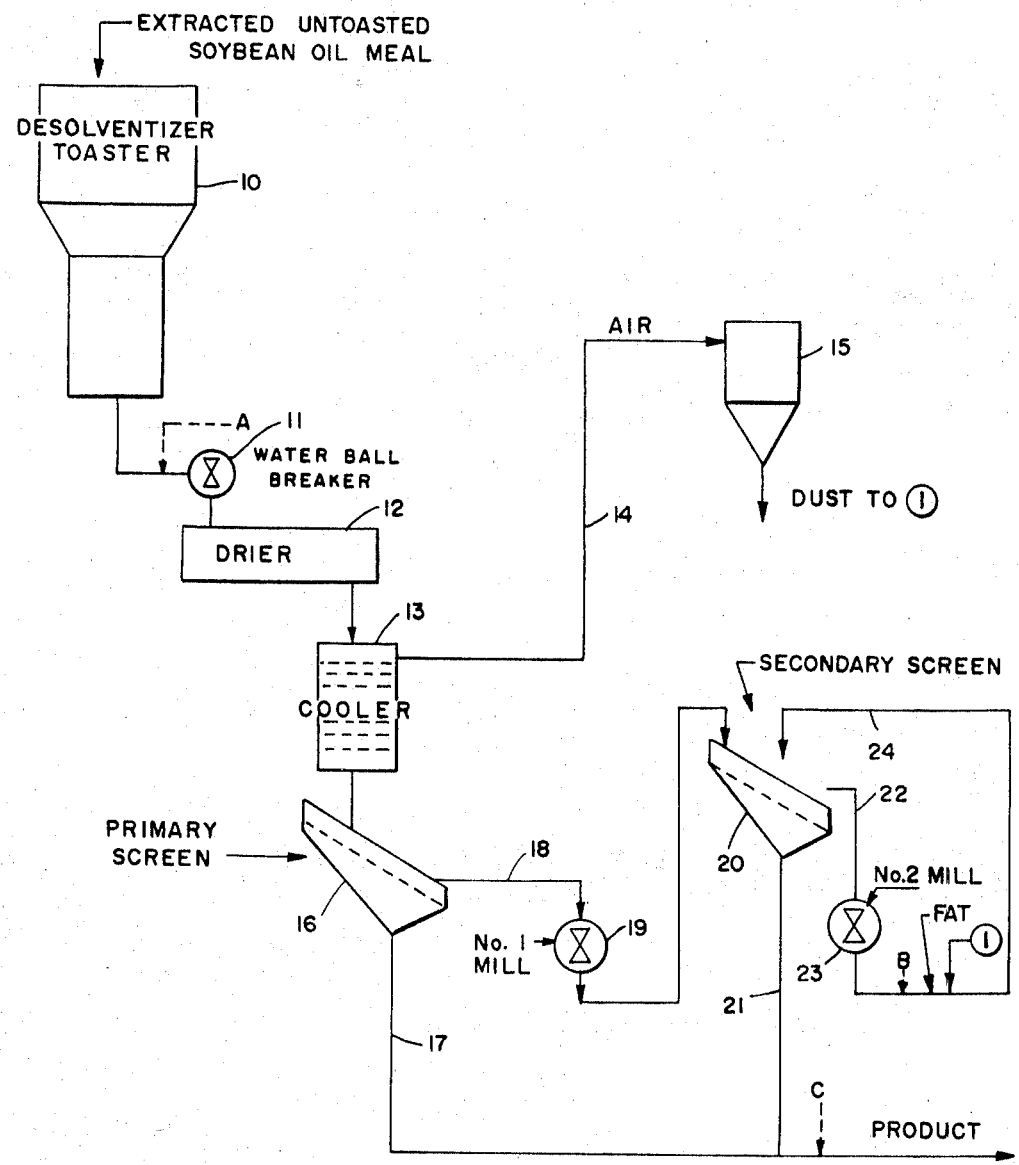

3,469,994
TREATING SOYBEAN MEAL TO INHIBIT CAKING
Merl A. Williams, Craigville, Ind., assignor to Central Soya Company, Inc., Fort Wayne, Ind., a corporation of Indiana
Filed June 13, 1966, Ser. No. 557,209
Int. Cl. A23l 1/20
U.S. Cl. 99—98                                   11 Claims

ABSTRACT OF THE DISCLOSURE

Soybean meal is toasted to form meal particles of varying sizes and the meal passed over screens to separate smaller particles from large oversize particles, the oversize particles being ground to expose the interior tacky portions thereof, and the tacky portions of the particles being coated with an inert fine coating powder clinging to the particles to inhibit caking. In addition, a small amount of fat may be added with the coating powder to make the product free flowing.

---

The invention relates to treating soybean meal to inhibit caking. The invention is particularly useful in preventing soybean meal from "setting up" during storage in large blocks which resist removal from the storage vessel.

For many decades there has been trouble with the storaged and shipment of soybean meal arising out of the tendency for the meal to cake or set up in blocks so that removal becomes very difficult. As the meal is manufactured, it is normally stored in large bins or silos and the meal is later removed for shipment by rail, steamer, or other means of transportation. It is found that as material is removed from the lower portion of the bin or silo, large blocks of the material remain in the upper portion of the bins and these often fall with explosive force to break open the lower part of the bins. In hopper cars and in ship holds, the meal tends to set up and dislodgement is extremely difficult and expensive in time and labor. A further problem arises out of the dust found in the meal material and such dust, in addition to being objectionable from the standpoint of use and loss, presents a hazard in mills where the product is being processed.

Soybean meal is peculiar in that it has a very high protein content and in its native state the protein is water-solube, and this gives adhesive properties to soybean meal. In many respects, the product is a glue-like material. The use of powders or dust coatings for overcoming the tacky character of the product would appear to be prohibitive and economically unsound, and further the use of any such additives would increase the dust problems. In any event, the solution of the caking problem has not been discovered in spite of the need for a solution.

I have discovered that by toasting soybean meal at temperatures above 212° F., it is possible to produce a large fraction of particles which will pass through a #8–10 mesh U.S. standard screen, and that such particles which may constitute between 30 and 50% of the meal do not require treatment. Such particles have hard, glazed, and often glossy exteriors and do not have substantial amounts of surface water-soluble protein. The oversize particles are passed to a hammer mill or other grinding equipment to be reduced in size so that they will pass through #10–12 mesh screen or a screen of larger or smaller mesh as may be desired.

I have discovered that it is the oversize and recycled ground material which is responsible for the caking or setting up of the meal. These larger particles have interior portions in which the protein remains substantially more water-soluble, and when such larger particles are ground, the interior water-soluble protein material is exposed. To solve the problem, it is only necessary to treat such exposed portions, using an inert powder or dust-like material. Best results have been obtained by using kaolin. Kaolin is a clay having as a constituent the mineral kaolinite which is hydrated aluminum silicate. The material is in very fine, substantially talc condition. I prefer to use such a material having 87–98% in a particle size less than two microns.

Instead of kaolin, beneficial results can be obtained with other inert powders or fine material, such as, for example, limestone, clays, starch, etc. None of such inert, dust-coating agents, however, have been found to be as effective as kaolin.

It was surprising to find that so little of the kaolin, etc. need be employed to obtain a meal product in which caking was inhibited. With a coating of kaolin as low as .1%, beneficial results were obtained, while with a coating of from .25–.5% by weight, caking was overcome and without increasing the dustiness of the product.

I further discovered that while the addition of fat to soybean meal does not in itself prevent caking, the addition of small amounts of fat with the inert dusting agent is effective not only in inhibiting caking but actually causes the soybean meal to become free flowing.

A primary object, therefore, of the invention is to provide a process by which caking of soybean meal on storage is inhibited. A further object is to provide a process for treating soybean meal with a surprisingly small amount of coating dusting agent while effectively inhibiting caking. A further object is to treat soybean meal with a coating dust and with a fat material to make the meal flow. A still further object is to provide a process wherein soybean meal or a ground fraction thereof may be effectively treated with a small amount of kaolin to inhibit caking or setting up of the meal on storage. Other specific objects and advantages will appear as the specification proceeds.

The process may be carried out in several types of apparatus. If desired, the process may be carried out in apparatus as shown in the accompanying drawing in which the apparatus is shown in a diagrammatic layout.

In one embodiment of the invention, the soybean meal is toasted at a temperature above 212° F. to form small particles which will pass through a screen such as, for example, a #10 mesh screen, and such particles may then be separated and recovered as product. The oversize particles which do not pass through the screen may be passed to grinding apparatus for reduction to smaller size. I have found that such larger particles have interior protein portions which are water-soluble and which are responsible for the caking or setting up of the soybean meal. The coating dust material, such as kaolin, is applied to such interior portions exposed by the grinding and the treated product may be withdrawn or, if desired, merged with the product from the first screen.

Apparatus, as shown in the drawing, may be utilized in carrying out the process. In the drawing, a desolventizer toaster 10 is employed to receive the extracted flakes or meal material. Ordinarily, the flakes, containing solvent, are passed into the upper portion of the toaster and subjected to steam for the removal of the solvent. To protect the protein, the flakes are usually wetted with added moisture or steam is caused to condense on the flakes. As the flakes are passed downwardly through succeeding tiers or chambers in the toaster, the temperature is increased above 212° F. and the meal particles formed are passed out through the bottom of the toaster. The toasting operation is preferably carried on to produce a substantial number of small particles which will pass through screens such as from #8–16 U.S. standard screens, and preferably through from #10–14 mesh U.S. standard screens. By using such screens, it is possible to make certain that the undersize particles passing through the screen have their protein content denatured and have no tendency to cake.

As shown in the drawing, the meal particles leaving the desolventizer toaster are passed to a water ball breaker 11 and from thence through a drier 12. From the drier, the material is passed through a cooler 13, and a substantial portion of the dust of the meal is withdrawn by an air current through line 14 to a cyclone dust collector 15. The meal particles are then passed to a primary screen 16, and the undersize particles which pass therethrough are withdrawn through conduit 17 and may be recovered separately as product or, if desired, merged with the oversize material after the same has been ground. The oversize material is withdrawn through conduit 18 to a hammer mill (grinding apparatus 19) and the ground material is then passed to a secondary screen 20. The secondary screen may have the same mesh size or sizes as employed for the primary screen 16. From the screen 20, the undersize material 21 passing therethrough may be withdrawn and merged with the product in conduit 17. The oversize material from screen 20 is recycled through conduit 22 to a second hammer mill or grinder 23 and the ground particles returned through line 24 to screen 20.

In the practice of my invention, the kaolin, or other coating dust material employed, may be added at a number of places. If desired, the material may be added at station B in the recycle step following grinding in mill 23. The advantage of this position of application is that the kaolin or the coating material is applied to the oversize material whose interior portions have been exposed and where the exposed water-soluble interior portions readily take up the coating dust material.

If desired, the coating dust may be added at position C where the product is being withdrawn and passed over the scales (not shown) for weighing, etc. before shipment.

I have found that the coating material (preferably kaolin) may be advantageously added at position A, as indicated on the drawing, where the soybean meal is withdrawn from the desolventizer toaster and where it is hot and wet. As the steaming soybean meal leaves the toaster, condensation of the steam on the withdrawn particles gives the particles a surface moisture of about 17–18%, and such moisture under the temperature conditions of the meal (190–200° F.) causes the kaolin or other coating dust to adhere tightly to the particles, and particularly to the oversize particles which later are subjected to grinding operation. Thus, in the later grinding operations, the adhering kaolin, etc. is mixed thoroughly with the interior portions of such particles and is bound thereto.

While I have indicated three places at which the kaolin or other material may be applied, it will be understood that the treating material may be added at any desired point where it will be brought into contact at some stage with the exposed interior portions of the oversize soybean meal. Here, because of the tacky character of the water-soluble protein portions now exposed, it will cling and become effective in preventing the caking or setting up of the meal. On the hardened small particles, the kaolin will not cling, but will be carried along and may be recycled as desired. Hence, at whatever point of application, it may be said that the coating dust is being applied to the exposed interior portions of the ground oversize meal particles because it is to these portions that the material clings and is utilized to prevent caking.

By reason of the use of the coating material for the exposed interior portions of the oversize meal, the amount of the coating material may be greatly reduced. For example .125% by weight of the coating dust is effective in treating the soybean meal to inhibit caking. I prefer to use between about .2% and .4%. While .5% may be employed, this larger amount increases the dust content of the product and provides substantially no advantage over the use of a smaller amount such as, for example, .25%.

I prefer to employ kaolin because it gives better results than the other dusting agents, and while the kaolin may be used in amounts of .1–1.0%, I prefer to use it in the range of .125–.5%, and preferably in the range of .2–.4%. Excellent results are obtained by the use of the kaolin in the amount of .25% by weight.

While I have found that the addition of fat to the soybean meal and to the oversize portion which is ground is ineffective in preventing a soybean meal from caking or setting up, I have discovered that the addition of small amounts of such fat to soybean meal which is also coated with a coating dust material greatly increases the flow qualities of the meal product. Why this occurs, I am unable to state. While, as stated, the fat itself is ineffective in preventing caking, when combined in use with the kaolin, etc., the flow qualities of the meal are greatly enhanced and for the first time, according to my experience, the meal itself becomes free flowing. It may be that the fat is effective in binding the kaolin, etc. on the meal particles so that in later stages as, for example, when the meal is dropped into a storage bin, the kaolin remains bound to the particles and thus is made more effective in preventing caking during storage. Whatever be the explanation, it is found that the fat in combination with the coating dust material creates a flow condition of the meal product which is not achieved by the use of the coating dust or the fat separately.

The fat may be any fat material which may be heated and applied to the meal in a liquid condition and preferably thereafter cooled so as to set up on the meal particles. For example, the fat may be dropped in liquid form at a point below the hammer mill 23, as indicated in the drawing, or if desired the fat may be sprayed upon the meal particles. For example, the fat may be applied at a temperature of about 100° F. in liquid form and it may set upon the meal particles at a temperature of about 80–85° F. so as to provide a firm coating for the particles. However, if desired, the fat may be in the form of an oil which is liquid at ambient temperatures and therefore need not be heated. Fat in this form is effective in binding the particles. The fat may be animal or vegetable fat or combinations thereof. For example, it may be lecithin, soybean foots, cottonseed foots, animal fats, etc. The fat may be added in the proportions of about 0.05–.5%. I prefer to add it in the range of about .1–.2% by weight.

In determining whether a treated soybean meal will set up or cake, I employ test apparatus in which conditions of storage in bins are simulated and, by comparing the results of such tests and actual results obtained in storage bins, I find that the tests are accurate in predicting the results that will be obtained in actual plant storage and storage in shipment containers. In the tests, I employ a canister which holds about 18# of soybean meal. The canister is tubular and is split along one vertical side, the split portions being held together by a vertical coupling pin. When the pin is withdrawn, the canister opens and may be removed. The bottom of the canister rests upon a support platform having a 2" opening directly under the center of the canister bottom. The 2" opening is normally closed by a cork stopper. In operation, the canister is placed over the 2" opening of the support platform and the cork stopper is pressed into the opening to close it. About 18 pounds of soybean meal are then introduced into the canister. A wooden pressure block or plug is placed over the top of the meal and a 100 pound weight is placed over the wooden plug. The material is stored under these conditions for 48 or more hours, and after that time the settling of the material in the canister is determined. The wood gauge block has graduations enabling a reading to be taken readily of the extent of settling. The 2″ plug from the support stand is then removed. If the meal flows through the 2″ hole, the entry is made that the meal "flowed."

If there is no flowing through the 2″ hole, the weight is taken off of the wooden gauge block and the coupling pin is pulled and the canister removed. After the canister is removed and if the cylinder of meal particles falls apart, the reading is entered as 0.

If the cylinder of meal does not fall down after the canister is removed, one pound weights are placed upon the top of the wooden block and the application of the weights at intervals is continued until the weight is sufficient to cause the cylinder of meal to break down. The final weight which brings about the falling down of the cylinder is indicated in the record as "the weight to break down pack."

In tests made using the above apparatus and employing as test material actual samples from plant operations where kaolin and other coating test materials are used, I have found that the addition of kaolin is extremely effective, even in small proportions, giving a test result of 0, while when fat is also added the meal "flows."

Specific examples illustrative of the process may be set out as follows:

EXAMPLE I

Soybean meal containing approximately 50% protein was treated with .5% kaolin, the kaolin being added to the finished meal, as indicated at point C on the drawing. The kaolin increased the amount of dust when the meal was handled and caused an increased conveyor load, but did improve the flowability of the meal. While under the canister test above described, 14# were required to break down the pack where kaolin was not added, the adding of the kaolin gave a 0# reading.

EXAMPLE II

The process was carried out as described in Example I except that the kaolin was reduced from .5% to .25%, and the kaolin was added to the meal which was dried down to 10% moisture. The addition of the kaolin as a coating agent again reduced bin set-up. While under the pack canister test, 21 pounds were required to break down the pack before the kaolin was added, after the kaolin was added, the reading was 0#.

EXAMPLE III

The process was carried out as described in Example I except that .25% to 0.5% kaolin was added to the hot, wet meal leaving the desolventizer toaster, as shown in the drawing. The addition of the kaolin at this point helped to reduce the dustiness of the coated meal. Further, it was found that the addition of the kaolin in this location improved the resistance to bin set-up as follows: While it required 15# to break down the pack test before the kaolin was added, after the kaolin was added it required 0–5#, the results of the test being set out in the following table:

TABLE I

| Sample No. | Percent kaolin added | Meal temp. when on pack | Weight on pack (lb.) | Weight to break pack (lb.) | Moisture of meal | Protein as is |
|---|---|---|---|---|---|---|
| 1 | None | 95 | 100 | 15 | 12.31 | 49.92 |
| 2 | .25 | 95 | 100 | 0 | 11.99 | 50.07 |
| 3 | .50 | 72 | 100 | 0 | 11.94 | 49.70 |
| 4 | .50 | 72 | 200 | 0 | 11.94 | 49.70 |

EXAMPLE IV

The process was carried out as described in Example III, .25% kaolin being added to the hot, wet meal from the desolventizer toaster, but in addition .125% of feed fat was added to the meal recycle system, as indicated in the drawing. Before adding the kaolin, 13# were required to break down the pack. After the kaolin and fat were added, the finished meal "flowed." This was the first time that I have had 12.5–13% moisture finished meal to flow from a pack test. Many other tests with kaolin alone (no fat) have never produced a product which flowed directly on removing the 2″ plug as the combination coating did in this test.

EXAMPLE V

This test was made on a plant scale preparing soybean meal containing about 50% protein. In the test, I have compared the setting up of the meal from the primary screen and from the secondary screen and from the point "C" where the finished meal is being passed to the scales. In the tests, kaolin is compared with other coating agents, and the use of fat alone and in combination with kaolin is also shown. The results are shown in the following table:

TABLE II

| Sample No. | Type of meal used | Type of coating used | Percent of coating | Moisture | H₂O protein | Temperature | Settling (in.) | Weight to break down pack |
|---|---|---|---|---|---|---|---|---|
| 1 | Primary screens | None | 0 | 11.62 | 11.81 | 84 | 1¼ | 0.0 |
| 2 | Secondary screens | do | 0 | 12.59 | 13.12 | 82 | ¾ | 22.5 |
| 3 | From scales ("C") | do | 0 | 12.19 | 12.69 | 84 | 1¼ | 10.0 |
| 4 | From scales | Kaolin | ⅛ | | | 84 | 1¼ | 2.0 |
| 5 | do | do | ¼ | | | 84 | 1¼ | 0.0 |
| 6 | do | do | ½ | | | 84 | 1½ | 3.5 |
| 7 | do | Calcium carbonate | ¼ | | | 84 | 1¼ | 8.0 |
| 8 | do | Petro A G Special | ¼ | | | 84 | 1¼ | 40.0 |
| 9 | do | Fat | ¼ | | | 84 | 1¼ | 2.0 |
| 10 | do | Syloid 72 (silica gel) | ¼ | | | 84 | 1¼ | 3.5 |
| 11 | do | Bentonite | ¼ | | | 84 | 1¼ | 10.5 |
| 12 | do | ¼% kaolin, ⅛% fat | | | | 84 | 1½ | 0.0 |

In the above table, "Syloid 72" is a silica gel product manufactured by Grace, and "Petro A G Special" is a fine clay dusting agent.

As will be seen from the above table, the .25% kaolin (with 0.125% fat or without) gave better results than any of the other coatings for reducing setting up and producing a dust-free soybean oil meal.

The adding of the fat reduced dust in the product. As noted in Example IV, the addition of the fat with the kaolin also gives better flowability than kaolin alone, but the conditions in Example V were not severe enough to make this differentiation.

It will be understood that in the toasting operation carried on in the desolventizer toaster or in any cooking or toasting apparatus, it is possible to carry on the toasting in such a manner so that the particle size of the meal is predominantly in the size which will pass through a #10 mesh screen, the particles having their surface protein content largely denatured and thus presenting no problem from the standpoint of caking, and in this manner the oversize fraction, which alone presents a problem, will require a minimum of treatment with the kaolin, etc. With a kaolin content of only about .2% by weight or .25%, it is found that the dust content of the product is not increased. Further, with the use of fat in the amount of .05–.5%, or preferably in the amount of about .25%, the dust content of the final product is substantially reduced below that normally obtained in preparing soybean meal and further improvement in flowability is obtained.

While in the foregoing specification, I have set out procedure and specific treating materials in considerable detail for the purpose of illustrating the embodiments of the invention, it will be understood that such details may be varied widely by those skilled in the art without departing from the spirit of my invention.

I claim:

1. A process for treating soybean meal to inhibit caking thereof on storage comprising the steps of toasting the meal at a temperature above 212° F. to reduce the water-solube protein content thereof and to form meal particles of varying sizes, passing the toasted meal particles over an 8–16 U.S. standard screen to separate the smaller particles from the large oversize particles, grinding oversize larger particles to expose the interior tacky portions thereof, and contacting said interior portions with an inert fine coating powder in an amount sufficient to coat and cling to said portions to inhibit caking, but insufficient to cause appreciable dustiness.

2. A process for treating soybean meal to inhibit caking thereof on storage comprising the steps of toasting the meal at a temperature above 212° F. to reduce the water-soluble protein content thereof and to form meal particles of varying sizes, passing the toasted meal particles over an 8–16 U.S. standard screen to separate the smaller particles from the large oversize particles, grinding oversize larger particles to expose the interior tacky portions thereof, and contacting said interior portions with an inert fine coating powder in an amount sufficient to coat and cling to said portions to inhibit caking, but insufficient to cause appreciable dustiness, said coating powder being kaolin.

3. A process for treating soybean meal to inhibit caking thereof on storage comprising the steps of toasting the meal at a temperature above 212° F. to reduce the water-soluble protein content thereof and to form meal particles of varying sizes, passing the toasted meal particles over an 8–16 U.S. standard screen to separate the smaller particles from the large oversize particles, grinding oversize larger particles to expose the interior portions thereof, and contacting said interior portions with an inert fine coating powder in an amount sufficient to coat and cling to said portions to inhibit caking, said powder being present in an amount less than 1.0%.

4. A process for treating soybean meal to inhibit caking thereof on storage comprising the steps of toasting the meal at a temperature above 212° F. to reduce the water-soluble protein content thereof and to form meal particles of varying sizes, adding an inert coating powder to said meal, passing the toasted meal particles over an 8–16 U.S. standard screen to separate the smaller particles from the large oversize particles, grinding oversize larger particles to expose the interior tacky portions thereof, and contacting said interior portions with an inert fine coating powder in an amount sufficient to coat and cling to said portions to inhibit caking, but insufficient to cause appreciable dustiness.

5. A process for treating soybean meal to inhibit caking thereof on storage comprising the steps of toasting the meal at a temperature above 212° F. to reduce the water-solube protein content thereof and to form meal particles of varying sizes, adding an inert fine coating powder to the meal while said meal is hot and wet after the toasting operation, passing the toasted meal particles over an 8–16 U.S. standard screen to separate the smaller particles from the large oversize particles, grinding oversize larger particles to expose the interior tacky portions thereof, and contacting said interior portions with an inert fine coating powder in an amount sufficient to coat and cling to said portions to inhibit caking, but insufficient to cause appreciable dustiness.

6. A process for treating soybean meal to inhibit caking on storage comprising the steps of toasting the meal at a temperature above 212° F. for a time sufficient to produce small size particles having the surface protein content thereof substantially denatured and larger size particles having interior portions containing water-soluble protein, separating said small size particles from said large size particles, withdrawing said small size particles as product, grinding said larger size particles to expose said water-soluble protein interior portions, and contacting said interior portions with kaolin to coat and cling to such portions to inhibit caking, said kaolin being present in an amount of about 0.1–1.0% by weight of said meal.

7. A process for treating soybean meal to inhibit caking on storage comprising the steps of toasting the meal at a temperature above 212° F. for a time sufficient to produce small size particles having the surface protein content thereof substantially denatured and larger size particles having interior portions containing water-soluble protein, separating said small size particles from said large size particles, withdrawing said small size particles as product, grinding said larger size particles to expose said water-soluble protein interior portions, and contacting said interior portions with kaolin to coat and cling to such portions to inhibit caking, said kaolin being present in an amount of about 0.1–1.0% by weight of said meal, said kaolin having 87–92% in a particle size less than two microns.

8. In a process for treating soybean meal to prevent caking thereof on storage, the steps of toasting the meal at a temperature above 212° to produce small size particles having the surface protein content thereof substantially denatured and larger size particles having interior portions containing water-soluble protein, separating said small size particles from said larger size particles, grinding said larger size particles to expose said water-soluble protein interior portions, and contacting said interior portions with fine inert coating powder to coat the same and also coating said interior portions with fat in the proportion of about 0.05–.5% by weight.

9. The process of claim 8 in which said coating powder is about .2–.5 weight percent.

10. In a process for treating soybean meal to prevent caking thereof on storage, the steps of toasting the meal at a temperature above 212° F. to produce small size particles having the surface protein content thereof substantially denatured and larger size particles having interior portions containing water-soluble protein, separating said small size particles from said larger size particles, grinding said larger size particles to expose said water-soluble protein interior portions, and contacting said interior portions with fine inert coating powder to coat the same and also coating said interior portions with fat in the proportion of about 0.05–.5% by weight, said coating powder being kaolin in an amount of about 0.25 weight percent and said fat is present in about 0.125 weight percent.

11. A process for treating soybean meal to inhibit caking thereof on storage comprising the steps of toasting the meal at a temperature above 212° F. to reduce the water-soluble protein content thereof and to form meal particles of varying sizes, passing the toasted meal particles over an 8–16 U.S. standard screen to separate the smaller particles from the large oversize particles, grinding oversize larger particles to expose the interior tacky portions thereof, combining said smaller meal particles with the ground particles to provide combined meal particles, and applying an inert fine coating powder to said combined meal particles to contact said interior portions with said inert fine coating powder in an amount sufficient to coat and cling to said portions to inhibit caking, but insufficient to cause appreciable dustiness.

References Cited

UNITED STATES PATENTS

| | | | |
|---|---|---|---|
| 2,710,258 | 6/1955 | Kruse | 99—98 |
| 3,126,285 | 3/1964 | Lippold | 99—98 |

RAYMOND N. JONES, Primary Examiner

WILLIAM A. SIMONS, Assistant Examiner

UNITED STATES PATENT OFFICE
CERTIFICATE OF CORRECTION

Patent No. 3,469,994　　　　　　　　　　　September 30, 1969

Merl A. Williams

It is certified that error appears in the above identified patent and that said Letters Patent are hereby corrected as shown below:

Column 2, line 11, "98" should read -- 92 --.

Signed and sealed this 30th day of December 1969.

(SEAL)
Attest:

Edward M. Fletcher, Jr.　　　　　　　　　WILLIAM E. SCHUYLER, JR.
Attesting Officer　　　　　　　　　　　　　　　Commissioner of Patents